F. J. YANDLE.
FRUIT CLEANER, DIPPER, AND GRADER.
APPLICATION FILED APR. 23, 1918.
1,278,547.
Patented Sept. 10, 1918.
3 SHEETS—SHEET 1.
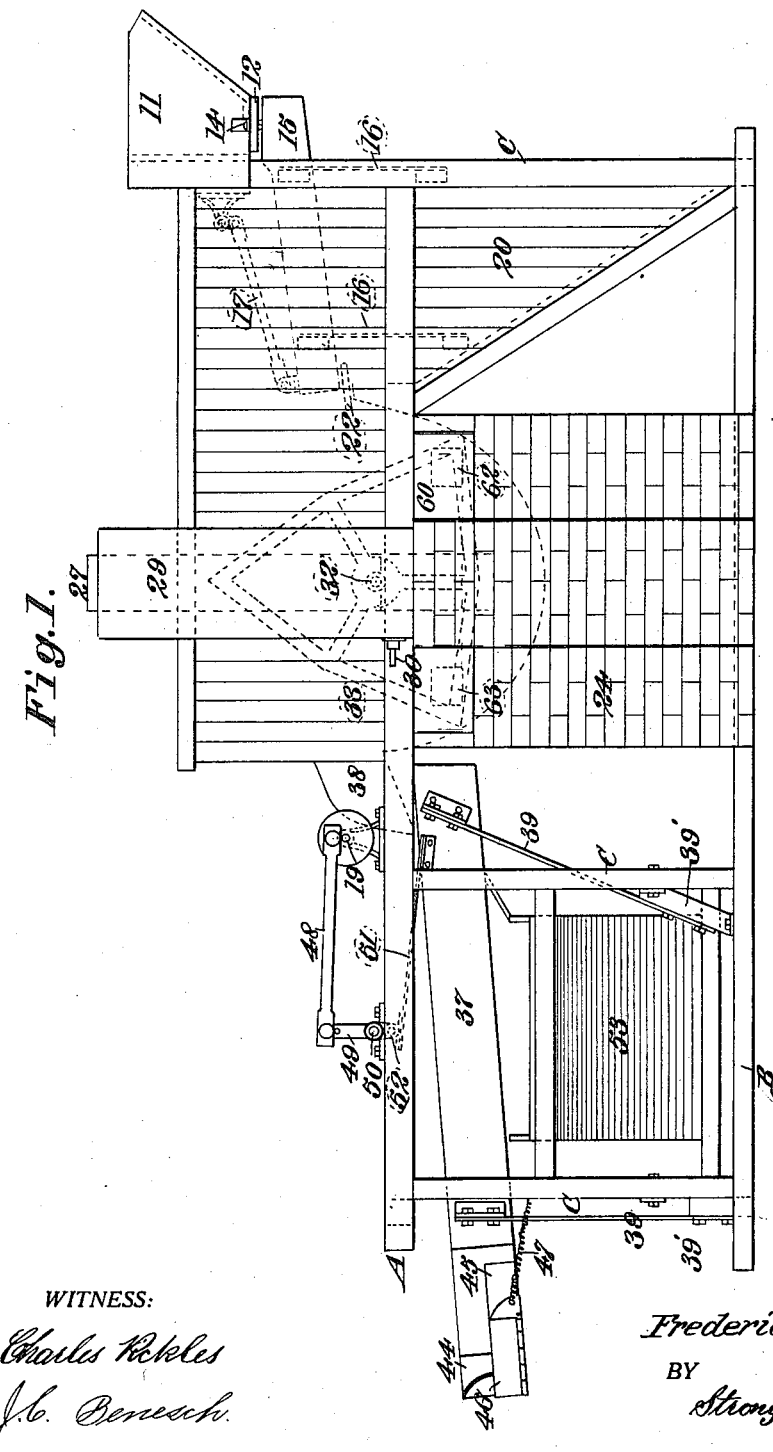
WITNESS:
INVENTOR.
Frederick J. Yandle
BY
Strong & Townsend,
ATTORNEYS.

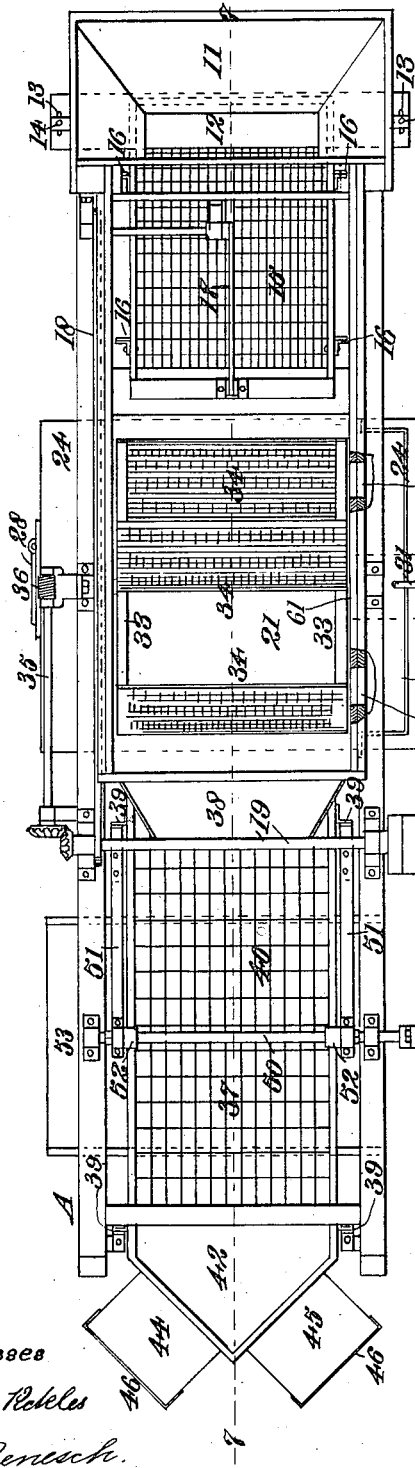

F. J. YANDLE.
FRUIT CLEANER, DIPPER, AND GRADER.
APPLICATION FILED APR. 23, 1918.
1,278,547.
Patented Sept. 10, 1918.
3 SHEETS—SHEET 3.
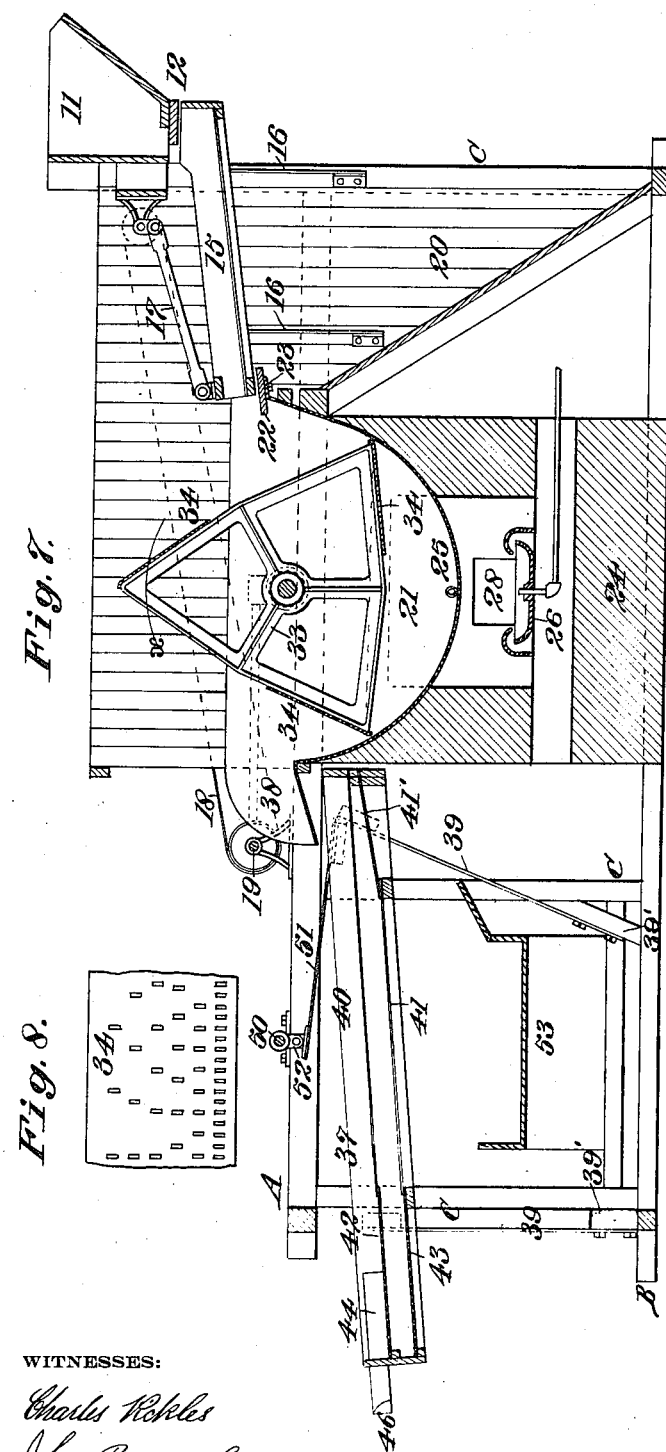
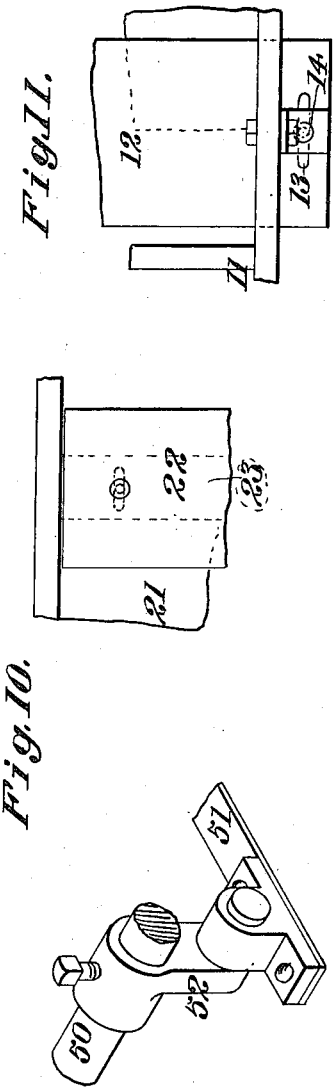
WITNESSES:
Charles Rokles
J. C. Benesch.
INVENTOR
Frederick J. Yandle
BY Strong & Townsend
ATTORNEYS

UNITED STATES PATENT OFFICE.

FREDERICK J. YANDLE, OF SANTA ROSA, CALIFORNIA.

FRUIT CLEANER, DIPPER, AND GRADER.

1,278,547.　　　　　Specification of Letters Patent.　　Patented Sept. 10, 1918.

Application filed April 23, 1918. Serial No. 230,311.

*To all whom it may concern:*

Be it known that I, FREDERICK J. YANDLE, a citizen of the United States, residing at Santa Rosa, in the county of Sonoma and State of California, have invented new and useful Improvements in Fruit Cleaners, Dippers, and Graders, of which the following is a specification.

This invention relates to fruit cleaning, dipping and grading machines; and has for its object to simplify and improve the construction and operation of machines of this sort.

In the device constructed with these ends in view, the fruit is first placed in a receiving hopper, whence it is discharged through a regulated opening onto a resiliently supported cleaning screen which also serves to conduct the fruit to the dipping mechanism, which in turn discharges it into a resiliently supported grading mechanism. The whole structure is mounted upon a unitary frame and is actuated by a single source of energy, thus permitting a uniform and readily adjustable operation.

One form of structure embodying the invention is exemplified in the following description and illustrated in the accompanying drawings, in which—

Figure 1 is a side elevation of the complete machine, the interior mechanism of the cleaning and dipping elements being shown in dotted lines.

Fig. 2 is a plan view of the structure.

Fig. 3 is a fragmentary perspective view of a portion of one of the screen supports.

Fig. 4 is a fragmentary cross-sectional view of the grading mechanism, showing the different sized screens.

Fig. 5 is a perspective view of the adjustable crank arm of the actuating mechanism for the grading screens.

Fig. 6 is a detail view of the worm gear used to drive the dipping mechanism.

Fig. 7 is a cross-sectional view on line 7—7 of Fig. 2.

Fig. 8 is a plan view of a portion of one of the perforated plates of the dipping wheel.

Fig. 9 is a fragmentary perspective view of the connection between the grading screens and the actuating mechanism.

Fig. 10 is a fragmentary view of the adjustable spout for the cleaning mechanism.

Fig. 11 is a similar view of the adjustable gate to regulate the discharge from the receiving hopper.

The structure comprises an upper frame A, supported above a lower frame B by means of supports C. At one end of the frame A a receiving hopper 11 is mounted upon extensions of the end supports C. The hopper 11 is fitted with an adjustable discharge opening formed by a gate 12, having transverse slots 13 at each end (Fig. 11), through which supporting bolts 14 extend. It is thus possible to adjust the position of the gate 12 to vary the discharge from the hopper 11. The contents of hopper 11, when discharged through this adjustable opening, fall on the upper end of an inclined cleaning screen 15, supported below hopper 11 and above frame A by flexible supports 16, fastened to the sides of the screen frame at their upper ends and on suitable portions of the frame structure at their lower ends.

These supports 16, as shown in Fig. 2, consist of flat strips of flexible material, such as spring steel, arranged with their greatest width at right angles to the direction of movement of the screen 15. This arrangement provides a movable support for the cleaning screen and eliminates pivotal connections and loose joints, with their attendant noise and wearing of parts. The peculiar motion and cushioning effect caused by this mounting for the screen serve to protect the fruit from bruises and also to expedite the screening operation by permitting comparatively rapid actuation of the parts.

Screen 15 is actuated by means of a pitman 17, driven by a belt 18 passing around a pulley on a main drive shaft 19, mounted transversely of frame A. The reciprocation of screen 15 causes the leaves, dirt and other small substances to fall through the screen and into a suitable chute, as shown at 20, and at the same time causes the cleaned fruit to discharge into the dipping tank 21. By means of an adjustable spout 22 slidably fitted to the upper edge 23 of the tank 21 (see Fig. 10) the point at which the fruit falls into the liquid contained in the tank can be kept practically constant, irrespective of the force or amount of discharge from screen 15. This arrangement assists in subjecting all the fruit to practically the same amount of dipping.

The tank 21 is supported by means of frame A and masonry 24. It is preferably constructed of galvanized sheet metal, and should, in a machine of the type here shown, be cylindrical in form. A suitable drain cock, as shown at 25, may be provided to facilitate cleaning. The masonry 24, on which tank 21 is fitted, serves as a furnace for applying heat to the dipping liquid and maintaining it at an even temperature. It is fitted with any suitable source of heat, such as an oil burner indicated at 26, together with a flue 27 and a gate 28.

A cylindrical liquid container 29 is fitted around the flue 27. Liquid is admitted to this container by an inlet 30, and discharged therefrom into the tank 21 through an outlet 31. By this arrangement the waste heat from the furnace is utilized to pre-heat the dipping liquid.

Journaled across frame A, at the axis of the cylindrical tank 21, is a shaft 32, to which hexagonal frames 33 are fitted. These frames are positioned interiorly of tank 21 and carry plates 34 which extend from one end of the tank to the other. Plates 34 are perforated, as shown in Fig. 8, and are so positioned on frames 33 that their edges having the greatest number of perforations are next to and in close engagement with the interior of the tank 21. Shaft 32, frames 33 and plates 34 are thus made into a unitary dipping member which is rotated in tank 21 in the direction of arrow $x$, by means of a shaft 35 and a worm gear 36, (Fig. 6).

The dipping member is geared to rotate at about three revolutions per minute and at this speed will submerge all the fruit passed through the machine the required length of time. The angle at which the plates 34 are held, by reason of the hexagonal shape of the frames 33, insures complete and equal submersion of all the fruit, as will be seen by noting the relative angle of the liquid level and the submerged plates in Figs. 1 and 7. The rotation of the dipping member not only submerges the fruit, but also lifts it out of the liquid and discharges it through a spout 38 into the grading mechanism. During this operation the fruit is thoroughly and uniformly drained by means of the graduated perforations in the plates 34.

The grading mechanism which receives the fruit discharged from the dipping mechanism consists of an inclined frame 37, positioned below the frame A, with its upper end under the spout 38. The frame 37 is supported upon flexible members 39, similar in structure and function to the supports 16, the description of which applies equally well to those now under consideration and, therefore, need not be repeated. The only difference to be noted is the means to which the lower ends of the supports 39 are fastened. As shown in Fig. 3, these consist of members 39', preferably made of metal, one of which is angularly disposed between frame B and the supports C. This construction serves to brace the structure generally and also gives a lateral inclination to the supports 39 which increases their resiliency and gives them a motion peculiarly adapted to the grading process.

Interiorly of frame 37 a pair of screens 40 and 41 are fitted one above the other, as shown in Fig. 4, the upper screen 40 having a larger mesh than the lower one 41. As shown in Fig. 7, screen 41 does not extend to the upper end of frame 37 but terminates at an intermediate point in order to confine the discharge therethrough to the required area. An inclined floor 41' extends from screen 41 to the end of the frame 37 to receive the discharge through screen 40. The lower ends of the screens terminate in solid members 42 and 43 which serve as floors over which the fruit which is too large to fall through the screens is conducted. This fruit is then discharged through spouts 44 and 45, arranged at right angles to each other in the lower end of frame 37, which end, as shown in Fig. 2, is made up of two angularly disposed end pieces to receive the spouts. Each spout is provided with a suitable gate 46 and provided with a spring 47 to hold it either in open or closed position.

The means provided to actuate frame 37 and the grading screens therein comprise a pitman 48, connected at one end to a crank pin on the main shaft 19 and at the other end to a crank arm 49 on a shaft 50. This arm, as shown in Fig. 5, is provided with a plurality of holes to permit regulation of the amount of reciprocation imparted to the screens. The frame 37 receives movement from shaft 50 by means of flexible connecting rods 51, rigidly fastened at one end to the sides of the frame 37 and pivotally connected at the other end, as shown in Fig. 9, to crank arms 52 on shaft 50.

It is obvious that with this construction rotation of the main shaft 19 will cause a reciprocation of the crank arms 52, which in turn will result in a resilient longitudinal and vertical movement of the screens 40 and 41. This movement will cause the fruit, which cannot fall through screen 40, to pass through the upper spout and a second size will similarly be discharged from the lower spout. All the fruit which is small enough to pass through screen 41 will fall therethrough into a suitable chute thereunder, indicated at 53. Three grades of cleaned and dipped fruit are thus produced with a minimum expenditure of time and energy.

The whole process of cleaning, dipping and grading is confined to a single machine, so that a single source of energy and a single attendant are necessary. Furthermore, the novel features of construction disclosed permit a comparatively rapid treatment of the fruit without injury thereto.

By referring to Figs. 1 and 7, it will be seen that the rear arm 39 is placed on an incline. This is important as it lifts the rear end of the shaking screen in an upward direction, while the front end is being lowered, thereby producing a throwing action which materially assists in advancing the fruit to be graded over the screens. This feature may also be used in connection with the screen 15, if desired.

In connection with the heating tank 29, surrounding the tank 27, I wish to employ a circulating tank 60. This tank is separated from the main dipping tank 21 by a partition 61. Formed in said partition plate is a pair of openings 62 and 63 which are covered with a wire screen to permit a free circulation of the liquid between the main tank 21 and the circulating tank 60; that is, rotation of the dipper or movement of the scoops 34 causes the water to surge back and forth in the tank and, if anything, to have a rotary circulation. The addition of the circulating tank 60 obviates the continuous rotary circulation, as the surging of the water in the main tank causes a certain amount of it to enter the circulating tank through the screened opening 63 and a certain proportion to discharge from the circulating tank outwardly into the main tank 21 through the screened opening 62 and endwise circulation of the liquid in the tank is thus obtained and a greater body of liquid for dipping purposes is also secured.

Another important feature of the invention is the provision of the adjustable plate 22. By adjusting it in relation to the scoops 34 it is possible to obtain a spacing between the same which is so large that there is no danger of cutting or bruising the fruit when a scoop passes by. It will be observed that a compartment or chamber is formed directly below the adjustable plate which permits fruit which would otherwise get under the rear edge of the scoop to back away and follow behind the scoop or lie in position to be received by the forward face of the following scoop.

Previous to the formation of this space it was found that fruits, such as prunes, very often got between the bottom of the tank and the rear edge of the scoop, thus cutting and bruising the fruits to such an extent as to necessitate their removal before packing. This objection has been entirely overcome as any fruit struck by the rear edge of a scoop is forced backwardly into the space or chamber directly under the plate 22, thus preventing it from lodging between the scoop and the tank.

Having thus described my invention, what I claim and desire to secure by Letters Patent is—

1. In a machine of the character described, a receiving and cleaning mechanism comprising a hopper, an adjustable outlet therein, an inclined screen thereunder, flexible supports for said screen, means to reciprocate said screen, and an adjustable discharge spout for said screen.

2. In a machine of the character described, a fruit dipping mechanism comprising a tank containing a liquid, and a rotatable paddle wheel therein having blades with perforations increasing in number toward the outer edge, said blades being so positioned that the outer edges thereof enter the liquid after the opposite edges.

3. A fruit dipping mechanism comprising a liquid containing tank, means to submerge the fruit therein, and means to uniformly drain said fruit and discharge it from said tank, said means comprising a paddle wheel having blades with perforations increasing in number toward the outer edges of said blades.

4. In a fruit dipping mechanism, a dipping tank, fruit submerging means in the tank, and an adjustable spout associated with the tank to control the point of inlet of the fruit into the tank.

5. In a fruit dipping mechanism, a dipping tank, fruit submerging means in the tank, a cleaning and feeding screen having a discharge spaced above the tank, and adjustable means arranged in said space between the tank and screen to control the point of inlet of the fruit into the tank.

6. In a fruit dipping mechanism, a dipping tank, rotatable fruit submerging means in the tank, and a plate adjustable on the tank, said tank being formed to provide a chamber beneath the plate.

7. In a fruit dipping mechanism, a dipping tank, fruit submerging means associated with the tank, and a circulating tank adjacent the dipping tank and having an inlet and an outlet in communication with the dipping tank.

8. In a fruit dipping mechanism, a dipping tank, rotatable fruit submerging means in said tank, and a circulating tank arranged at one end of the dipping tank and having an inlet and an outlet communicating with the dipping tank and arranged respectively on opposite sides of the axis of rotation of the rotatable submerging means.

9. In a fruit dipping mechanism, a dipping tank, a feeding screen arranged in spaced relation above the tank, and means in said space between the screen and tank to receive the fruit from the screen and to control the point at which the fruit gravitates into the tank.

10. In a fruit dipping mechanism, a dipping tank, adjustable means adjacent the top of the tank to receive the fruit to control the point at which the fruit enters the tank, and reciprocating feeding means having a discharge overlying said controlling means.

In testimony whereof I have hereunto set my hand in the presence of two subscribing witnesses.

FREDERICK J. YANDLE.

Witnesses:
W. W. HEALEY,
JOHN H. HERRING.